United States Patent
Guo et al.

(10) Patent No.: US 12,456,485 B1
(45) Date of Patent: Oct. 28, 2025

(54) NOBLE METAL COATED PLASMONIC WAVEGUIDE BLOCKER FOR HEAT ASSISTED MAGNETIC RECORDING HEAD

(71) Applicant: Headway Technologies, Inc., Milpitas, CA (US)

(72) Inventors: Hong Guo, Fremont, CA (US); Dayu Zhou, Fremont, CA (US); Weihao Xu, San Jose, CA (US); Koji Shimazawa, Cupertino, CA (US); Tsutomu Chou, Chiba (JP); Yukinori Ikegawa, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/783,286

(22) Filed: Jul. 24, 2024

(51) Int. Cl.
| | |
|---|---|
| *G11B 5/31* | (2006.01) |
| *G11B 5/00* | (2006.01) |
| *G11B 5/48* | (2006.01) |
| *G11B 5/60* | (2006.01) |
| *G11B 13/08* | (2006.01) |

(52) U.S. Cl.
CPC .......... *G11B 5/4866* (2013.01); *G11B 5/3116* (2013.01); *G11B 5/3163* (2013.01); *G11B 5/6088* (2013.01); *G11B 13/08* (2013.01); *G11B 2005/0021* (2013.01)

(58) Field of Classification Search
CPC .......... G11B 5/314; G11B 5/6088; G11B 2005/0021; G11B 5/3133; G11B 5/3163
USPC .......... 360/59
See application file for complete search history.

(56) References Cited

U.S. PATENT DOCUMENTS

| | | |
|---|---|---|
| 9,852,752 B1 | 12/2017 | Chou et al. |
| 10,068,596 B2 | 9/2018 | Staffaroni et al. |
| 10,249,333 B2 | 4/2019 | Maletzky et al. |
| 10,262,683 B2 * | 4/2019 | Staffaroni ............ G11B 5/6088 |

* cited by examiner

*Primary Examiner* — Nabil Z Hindi
(74) *Attorney, Agent, or Firm* — DLA Piper LLP (US)

(57) ABSTRACT

The present embodiments relate to a noble metal coating on a parabolic waveguide blocker surface to future improve thermal gradient for HAMR head which can provide an improved thermal spot confinement over other designs. More particularly, the present embodiments relate to a component in the near field transducer (NFT), made of a metallic parabolic shaped waveguide blocker (PWB) with noble metal coating on the PWB surface. The designs as described herein can include a noble metal coating (e.g., Au, Rh, Ir, Pt, Aluminum (Al), etc.) which can enable a plasmonic effect on the PWB surface for HAMR thermal gradient improvement.

21 Claims, 19 Drawing Sheets

NOBLE METAL COATED PLASMONIC WAVEGUIDE BLOCKER FOR HEAT ASSISTED MAGNETIC RECORDING HEAD

TECHNICAL FIELD

Embodiments of the invention relate to the field of electro-mechanical data storage devices. More particularly, embodiments of the invention relate to the field of a heat-assisted magnetic recording (HAMR) write head for a hard disk drive (HDD).

BACKGROUND

Volumes of digital data can be stored on a disk drive, such as a Hard disk drive (HDD). The disk drive can comprise a head that can interact with a magnetic recording medium (e.g., a disk) to read and write magnetic data onto the disk. For instance, the disk drive can include a write head that is positioned near the disk and can modify a magnetization of the disk passing immediately under the write head.

Disk drives can utilize various technologies to write to a disk. For example, heat-assisted magnetic recording (HAMR) can convert optical power into localized heating in a magnetic recording medium to temporarily reduce the switching field needed to align the magnetizations of the medium grains. Sharp thermal gradients which translate into high magnetic gradients can enable a higher data storage density than achievable with other magnetic recording technologies. Since the heat spot size can be much smaller than the diffraction limit of light, plasmonic structures, also called near field transducers (NFT), can be used to deliver the desired confinement of the optical heating.

SUMMARY

The present embodiments relate to a noble metal coating on a parabolic waveguide blocker surface to future improve thermal gradient for HAMR head which can provide an improved thermal spot confinement over other designs. More particularly, the present embodiments relate to a component in the near field transducer (NFT), made of a metallic parabolic shaped waveguide blocker (PWB) with noble metal coating on the PWB surface. The designs as described herein can include a noble metal coating (e.g., Au, Rh, Ir, Pt, Aluminum (Al), and their alloy such as AuIr, RhIr, etc.) which can enable a plasmonic effect on the PWB surface for HAMR thermal gradient improvement.

In a first example embodiment, a heat-assisted magnetic recording (HAMR) write head is provided. The HAMR write head can include a main pole, a waveguide core, and a bilayer transducer disposed between the main pole and the waveguide core. The HAMR write head can also include a dielectric spacer layer disposed adjacent to the waveguide core and a parabolic waveguide blocker (PWB). The HAMR write head can also include a noble metal layer disposed between the PWB and the dielectric spacer layer.

In some instances, the noble metal layer comprises a thickness of between 20-100 nanometers.

In some instances, the noble metal layer comprises any of Ruthenium (Ru), Iridium (Ir), Platinum (Pt), and Gold (Au), and their alloy such as AuIr, RhIr, etc.

In some instances, the noble metal layer comprises a parabolic shape to match a shape of the PWB, and wherein the PWB comprises a taper angle of in the range of about 10-90 degrees with respect to ABS normal degrees.

In some instances, the dielectric spacer layer comprises dielectric materials such as Silicon Oxide (SiOx), Aluminum Oxide (AlOx), Titanium Oxide (TiOx), Magnesium Oxide (MgOx) and wherein the waveguide core comprises a high index material such as Niobium Oxide (NbOx), Tantalum Oxide (TaOx).

In another example embodiment, a device is provided. The device can include a waveguide core, a dielectric spacer layer disposed adjacent to the waveguide core, and a waveguide blocker. The device can also include a noble metal layer disposed between the waveguide blocker and the dielectric spacer layer.

In some instances, the device can also include a main pole and a bilayer transducer disposed between the main pole and the waveguide core.

In some instances, the waveguide blocker is triangular prism shaped or parabolic shaped.

In some instances, the noble metal layer comprises a thickness of between 20-100 nanometers.

In some instances, the noble metal layer comprises any of Ruthenium (Ru), Iridium (Ir), Platinum (Pt), and Gold (Au), and their alloy such as AuIr, RhIr, etc.

In some instances, the noble metal layer comprises a parabolic shape to match a shape of the PWB, and wherein the PWB comprises a taper angle in the range of about 10-90 degrees with respect to ABS normal.

In another example embodiment, a method for manufacturing a parabolic-shaped waveguide blocker with a noble metal layer is provided. The method can include depositing a metallic layer on top of a leading shield. The method can also include applying a first photoresist (PR) mask over at least a part of the metallic layer. The method can also include etching a portion of the metallic layer to form a tapered edge of the metallic layer with a taper angle.

The method can also include applying a second PR mask over at least part of the leading shield. The method can also include depositing a noble metal layer over the metallic layer and the second PR mask. The method can also include depositing a first oxide layer over the noble metal layer. The method can also include depositing a second oxide layer over the first oxide layer to serve as a waveguide core.

In some instances, the metallic layer comprises Ruthenium (Ru).

In some instances, the method can also include shaping the first PR mask into a parabolic shape and shaping the second PR mask into the parabolic shape.

In some instances, the etching the portion of the metallic layer is performed via an Ion Beam Etching (IBE) process, and wherein the taper angle is in the range of about 10-90 degrees with respect to ABS normal.

In some instances, the method can also include removing the first PR mask.

In some instances, the method can also include removing the second PR mask.

In some instances, the noble metal layer comprises any of Ruthenium (Ru), Iridium (IR) and Gold (Au), and wherein a thickness of the noble metal layer is between 20-80 nanometers.

In some instances, the method can also include planarizing the second oxide layer using a chemical mechanical planarization (CMP) process.

In some instances, the first oxide layer comprises materials such as Silicon Oxide (SiOx), Aluminum Oxide (AlOx), Titanium Oxide (TiOx), Magnesium Oxide (MgOx) and wherein the waveguide core comprises a high index material such as Niobium Oxide (NbOx), Tantalum Oxide (TaOx).

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Disk drives can utilize various technologies to write to a disk. For example, perpendicular magnetic recording (PMR) can relate to magnetic bits on a disk are directed perpendicular (e.g., either up or down) relative to the disk surface. PMR recording can increase storage density to the disk by aligning poles of magnetic elements on the disk perpendicularly to the surface of the disk.

Further, a disk drive head can include a main pole (MP) with a tip portion configured to be disposed near the surface of the disk. The distance between the main pole tip portion and the disk can be controlled by a dynamic fly height (DFH) writer heater. Particularly, DFH writer heater can heat a portion of the head, causing the MP to expand or contract, thereby modifying the distance between the main pole tip portion and the disk. Electrical energy can be provided to any of the DFH writer heater and the MP tip portion via electrical pads, forming a circuit in the head.

Heat-assisted magnetic recording (HAMR) is expected to be one of the future generation magnetic recording technologies that will enable recording at 1~10 Tb/inch2 data density. Utilizing the temperature dependence of the coercivity, HAMR can convert optical power into localized heating in a magnetic recording medium to temporarily reduce the switching field needed to align the magnetizations of the medium grains. Sharp thermal gradients which translate into high magnetic gradients can enable a higher data storage density than achievable with other magnetic recording technologies. Since the heat spot size can be much smaller than the diffraction limit of light, plasmonic structures, also called near field transducers (NFT), can be used to deliver the desired confinement of the optical heating.

In HAMR recording head, near field surface plasmon resonance on the NET is excited by a waveguide and heats the recording medium. While most of the optical energy is coupled to the NFT, there is still some uncoupled optical energy eventually radiating to the recording media as background. This uncoupled light can degrade the confinement of the thermal spot and further cause reduction of the thermal gradient.

Figure 1:
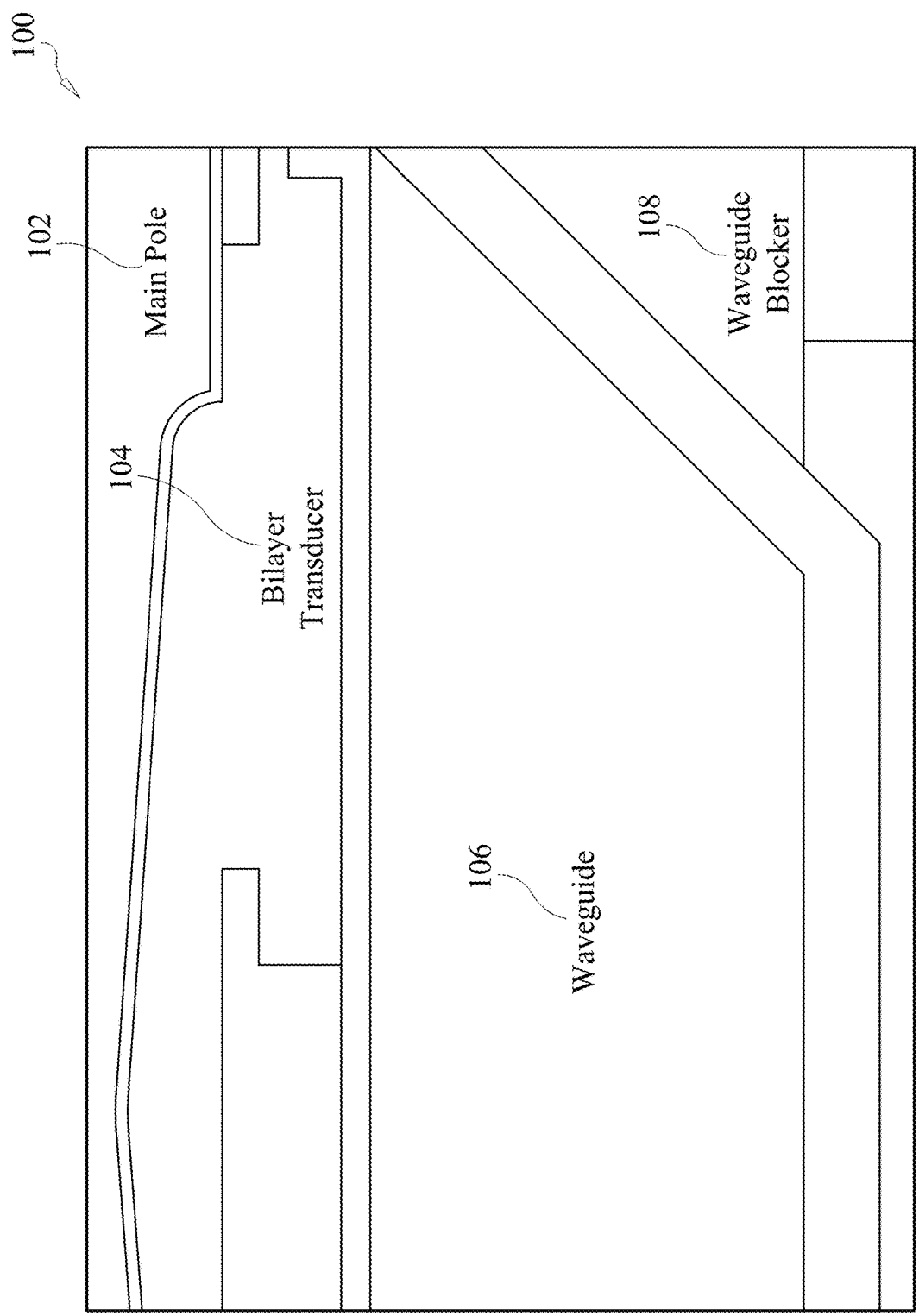
FIG. 1 is a cross-section view of a prior art HAMR NFT design.

Suppressing the optical background can be critical to improve the thermal gradient created by the NFT. While most of the energy inside the waveguide core can be coupled to the NFT, there is still some uncoupled lights that propagates inside the waveguide. This uncoupled electromagnetic radiation can travel through waveguide and emits in the form of radiative energy which heats the recording medium as a background which coexists with the main heat source generated by the NFT. This background can degrade the overall thermal gradient both along the recording track direction and the cross-track direction. A first design as shown in FIG. 1 shows a metallic blocker in front of the waveguide core to suppress this background radiative energy to the medium. FIG. 1 is a cross-section view of a prior art waveguide design. As shown in FIG. 1, the design 100 can included a main pole 102, a bilayer transducer 104, a waveguide 106, and a waveguide blocker 108.

Figure 2:
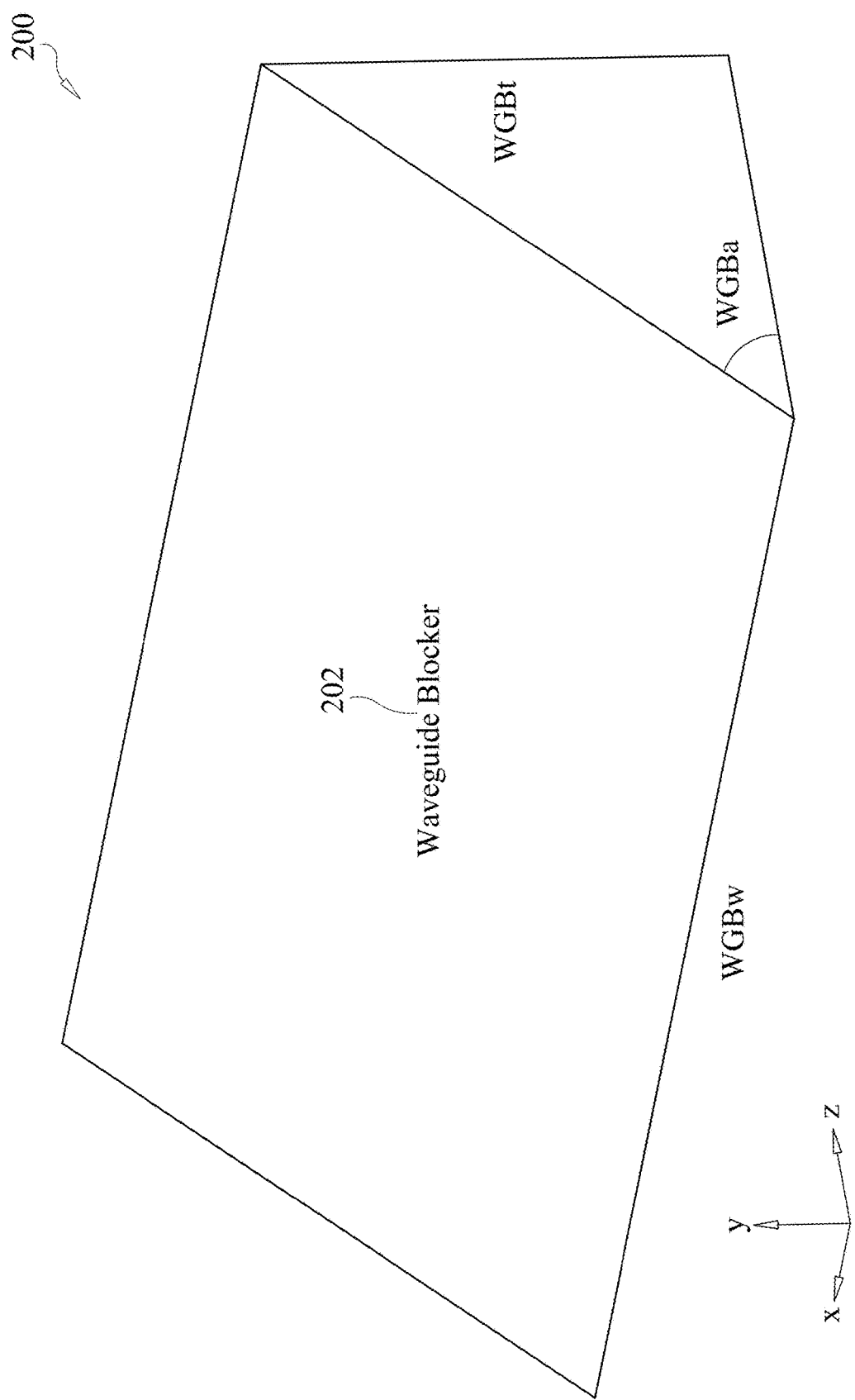
FIG. 2 is an illustration of an example prior art waveguide blocker.

FIG. 2 is an illustration of an example prior art waveguide blocker 202. The waveguide blocker can include triangular prism with slope angle WGBa, width at cross track direction of WGBw and a thickness of WGBt in the down track direction, which is shown in FIG. 2.

Figure 3A:
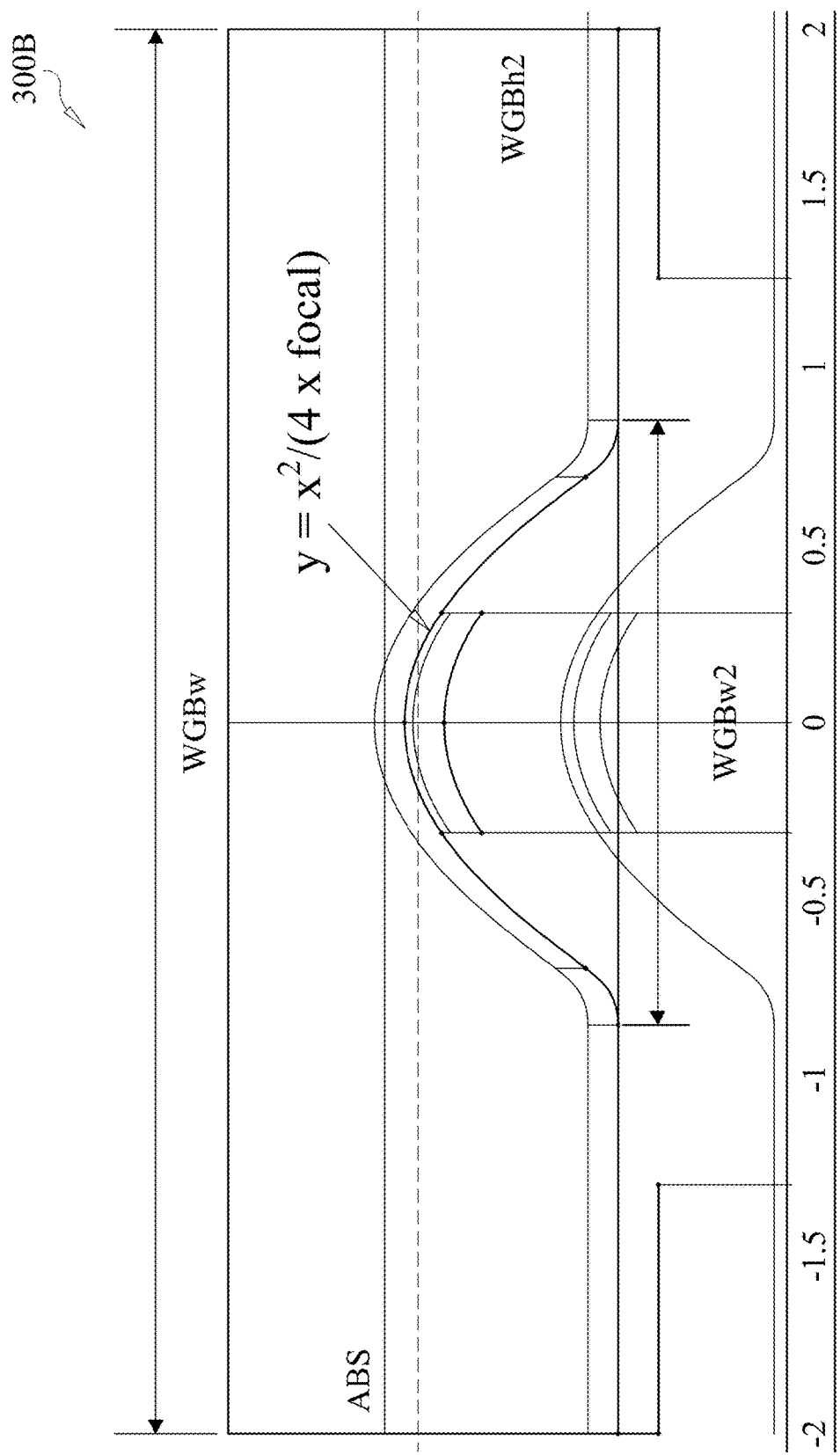
FIGS. 3A-3B illustrate a top view and a 3D view of an example PWB, according to some embodiments.
Figure 3B:
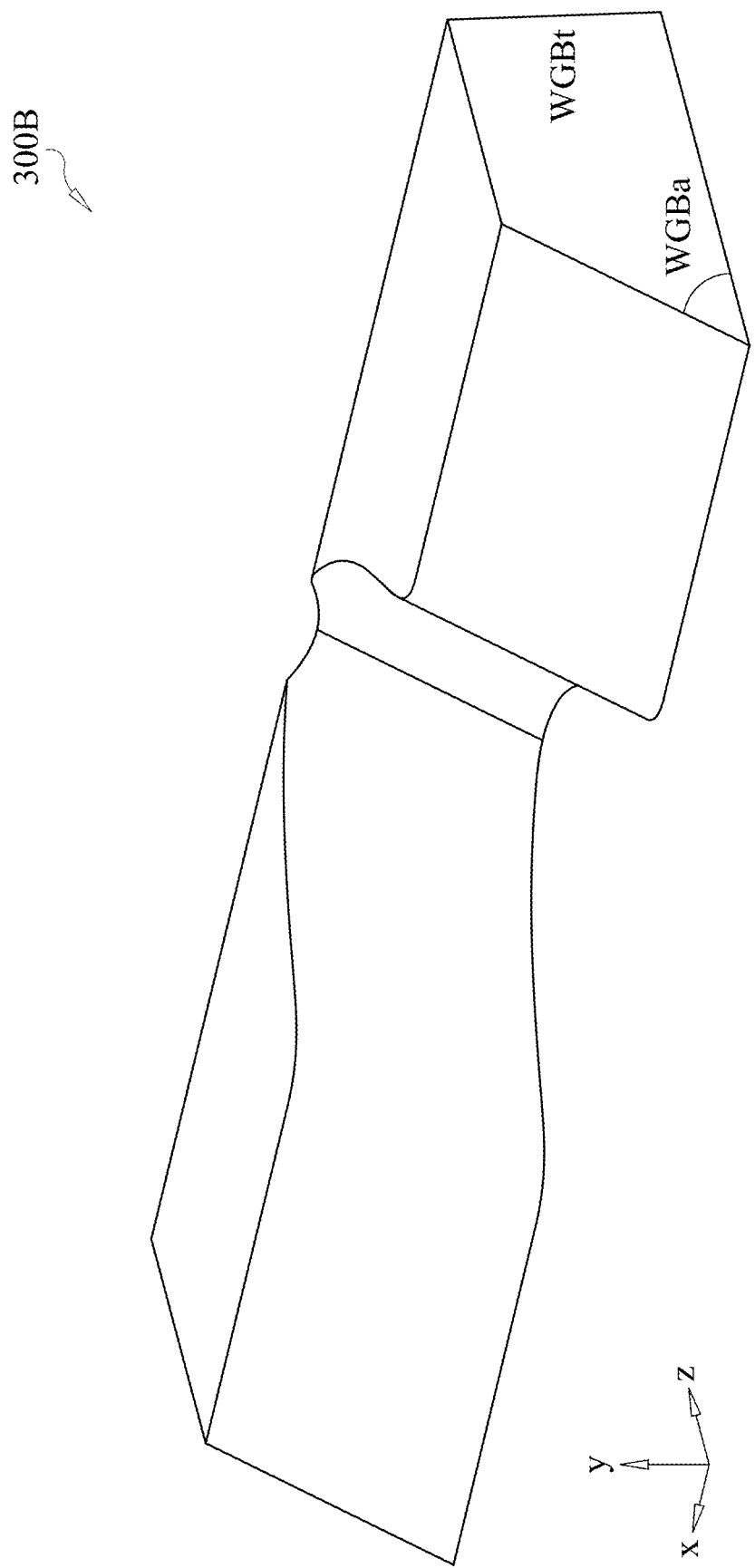

Other designs can include a parabolic shaped waveguide blocker (PWB) which can include a parabolic metal mirror surface to directional guide the uncoupled light to prevent this background entering the recording media. FIGS. 3A-3B illustrate both a top view and a 3D view of an example PWB 300A-B.

Figure 4:
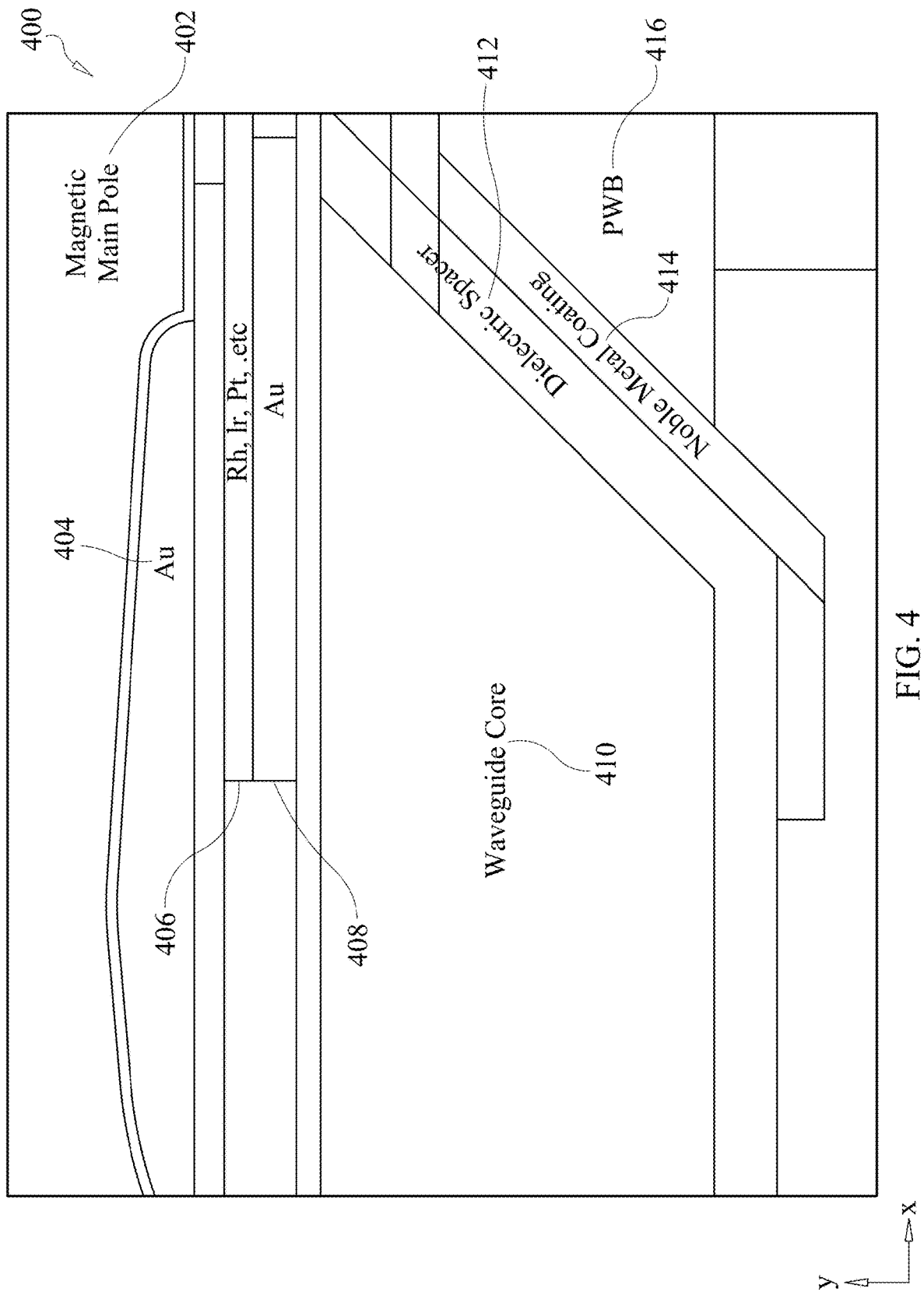
FIG. 4 illustrates an example cross-section view of a write head with a noble metal coated waveguide blocker, according to some embodiments.

The present embodiments relate to a noble metal coating on a parabolic waveguide blocker surface to future improve thermal gradient for HAMR head which can provide an improved thermal spot confinement over other designs. More particularly, the present embodiments relate to a component in the near field transducer (NFT), made of a metallic parabolic shaped waveguide blocker (PWB) with noble metal coating on the PWB surface. The NFT can be used in a HAMR head, which can include a first portion (plasmon generator) made of metal bilayer structure (e.g., top layer made of highly thermo-mechanically stable materials such as Rhenium (Rh), Iridium (Ir), Platinum (Pt), etc., and Gold (Au) on the bottom layer) which can be disposed on a dielectric waveguide core. The second portion can include the light delivery of HAMR head using a dielectric waveguide. In front of the waveguide core, PWB can include a metal structure which can be directly exposed to the air bearing surface (ABS), such as is shown in FIG. 4, for example. The designs as described herein can include a noble metal coating (e.g., Au, Rh, Ir, Pt, Aluminum (Al), etc.) which can enable a plasmonic effect on the PWB surface for HAMR thermal gradient improvement.

The present embodiments provide a noble metal coating on the parabolic waveguide blocker to excite plasmonic effect to enhance field focusing and improving the thermal gradient. Improving the thermal gradient of the NFT can further increase area density capacity (ADC) of HAMR head. Highly confined energy in the NFT can generate smaller thermal spot in the recording medium to improve thermal gradient and further improve area density capability of HAMR head.

FIG. 4 illustrates an example cross-section view of a write head 400 with a noble metal coated waveguide blocker. As shown in FIG. 4, the write head 400 can include a magnetic main pole 402, a first gold layer 404 disposed adjacent to the main pole 402. Further, a metallic layer 406 (e.g., comprising Rh, Ir, Pt, etc.) can be disposed between the first gold layer 404 and second gold layer 408. A waveguide core 410 can be disposed adjacent to the second gold layer 408 and a dielectric spacer 412. Further, a noble metal coating 414 can be disposed between the dielectric spacer 412 and a PWB 416. In the structure as shown in FIG. 4, a noble metal coating can include a first thin film deposited with thickness ranges from 20-100 nm on the PWB and then photo lithography patterned as the same shape as PWB with an offset. The parabolic shaped can be kept at the bottom of the coating as shown in FIGS. 5A-5B, for example.

Figure 5A:
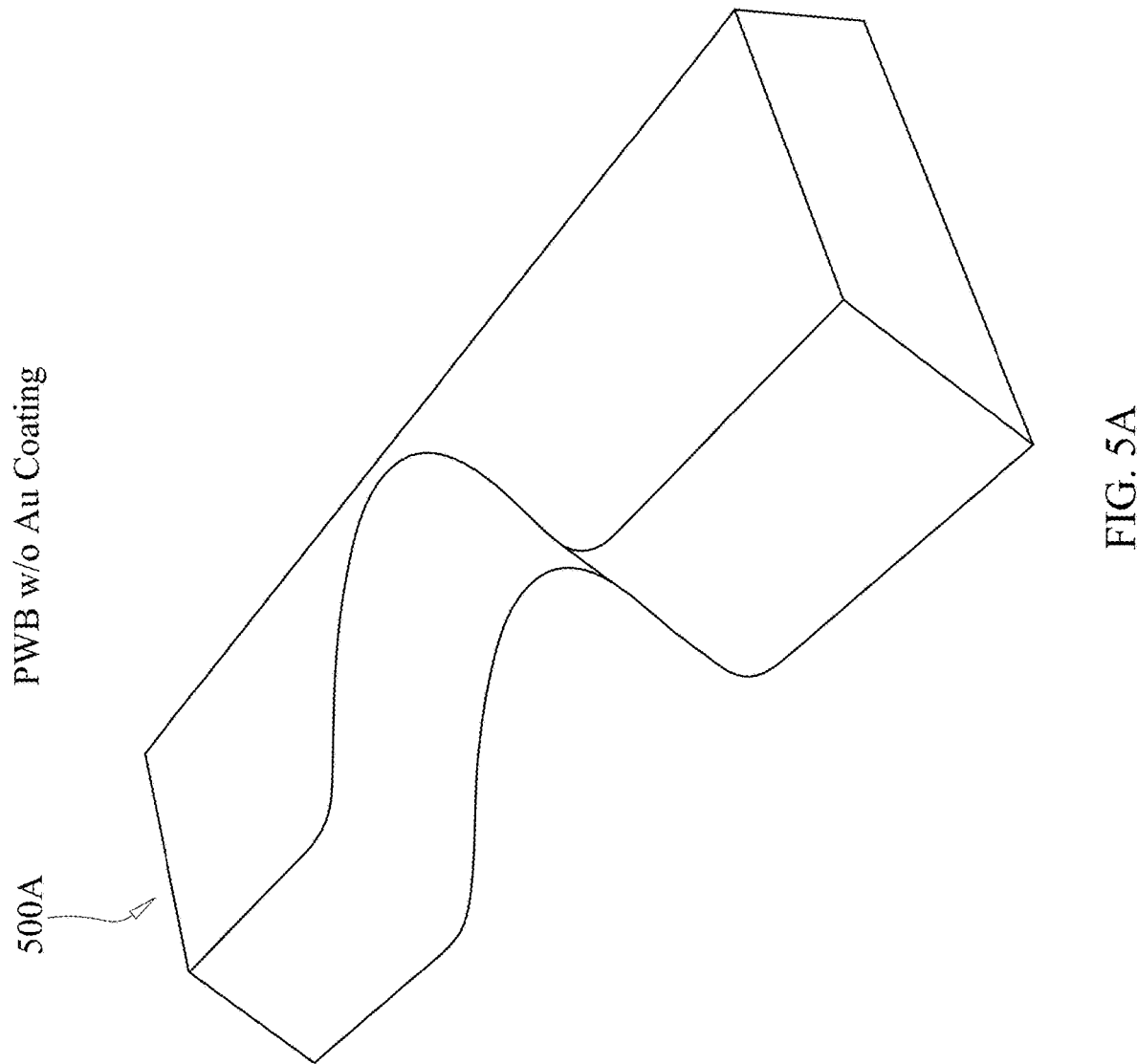
FIGS. 5A-5B illustrate example views of a PWB, according to some embodiments.
Figure 5B:
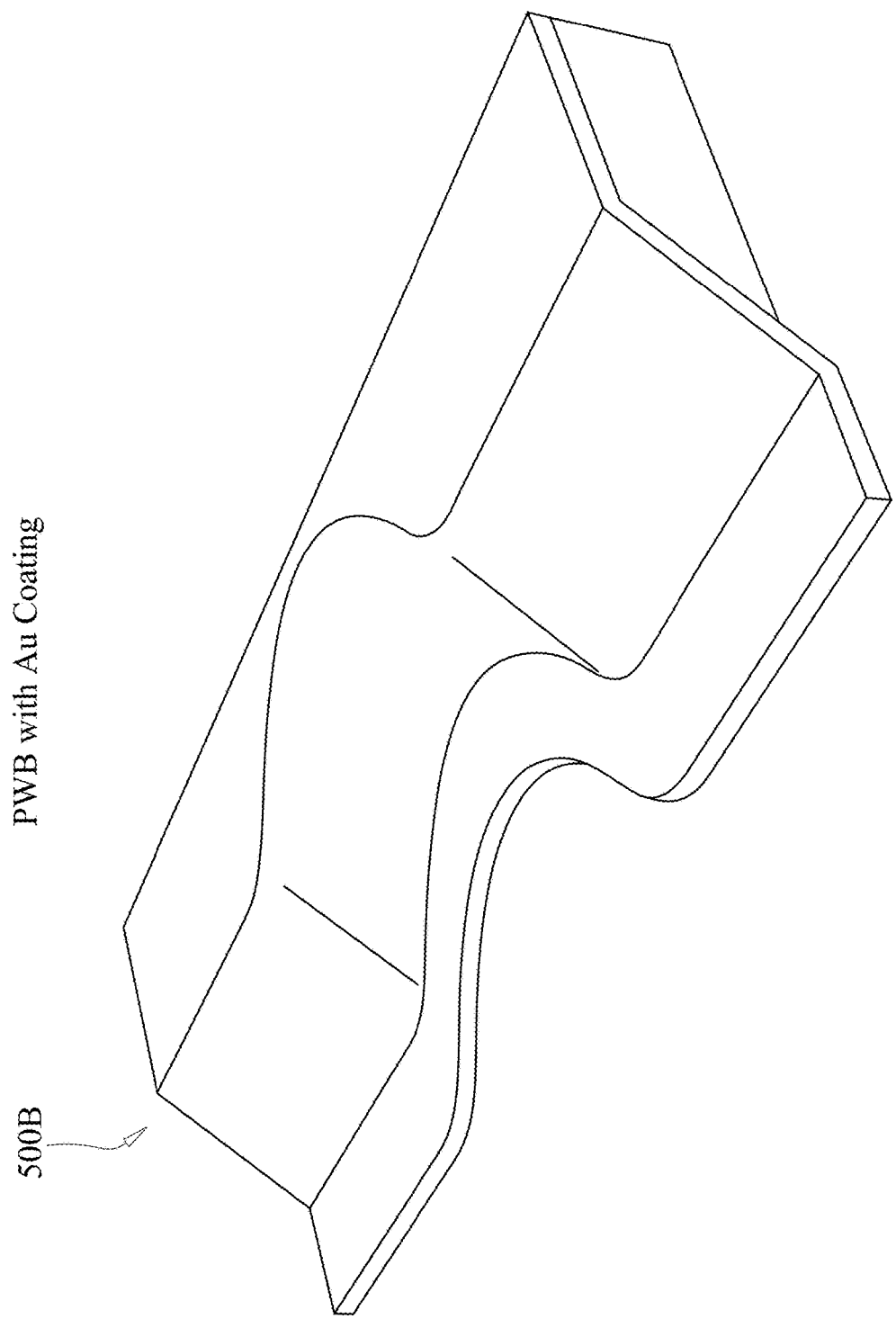

FIGS. 5A-5B illustrate example views of a PWB 500A-B. For instance, FIG. 5A illustrates a PWB 500A without a coating, while FIG. 5B illustrates a PWB 500B with an Au coating.

The write head structure as described herein can have a parabolic shaped waveguide blocker (PWB) made of highly thermo-mechanically stable material such as Rh, Ru etc., that is in front of the waveguide core near ABS. The parabolic shape can be defined by a focal length PWB_focal, the height of waveguide blocker in ABS direction WGBh2 and the width of waveguide blocker WGBw. From a 3D view, the PWB can have a tapered angle which forms a slope angle on the waveguide blocker defined by WGBa and a thickness of WGBt. On top of the PWB, a noble metal thin film of Rh, Ir, Pt or Au can be deposited on the PWB and then patterned with same parabolic shape with an offset with respect to the parabolic shape on top surface of the waveguide blocker.

The noble metal coating due to its excellent plasmonic optical properties can support surface plasmon polaritons (SPP) that can travel on the sloped metal and dielectric interface of waveguide blocker. Different from other HAMR designs, this SPP can be excited by the uncoupled light in the waveguide while majority of the electromagnetic energy can be coupled to the PPG of NFT to generate the writing heat spot on the medium. The surface plasmon resonance in the noble metals can be a highly confined localized surface energy, this secondary SPP excitation may not interfere with the main SPP field on the NFT PEG but can help to absorb the background energy and preventing these energy leak to the medium which can create thermal background and reduced thermal gradient of HAMR head.

Figure 6:
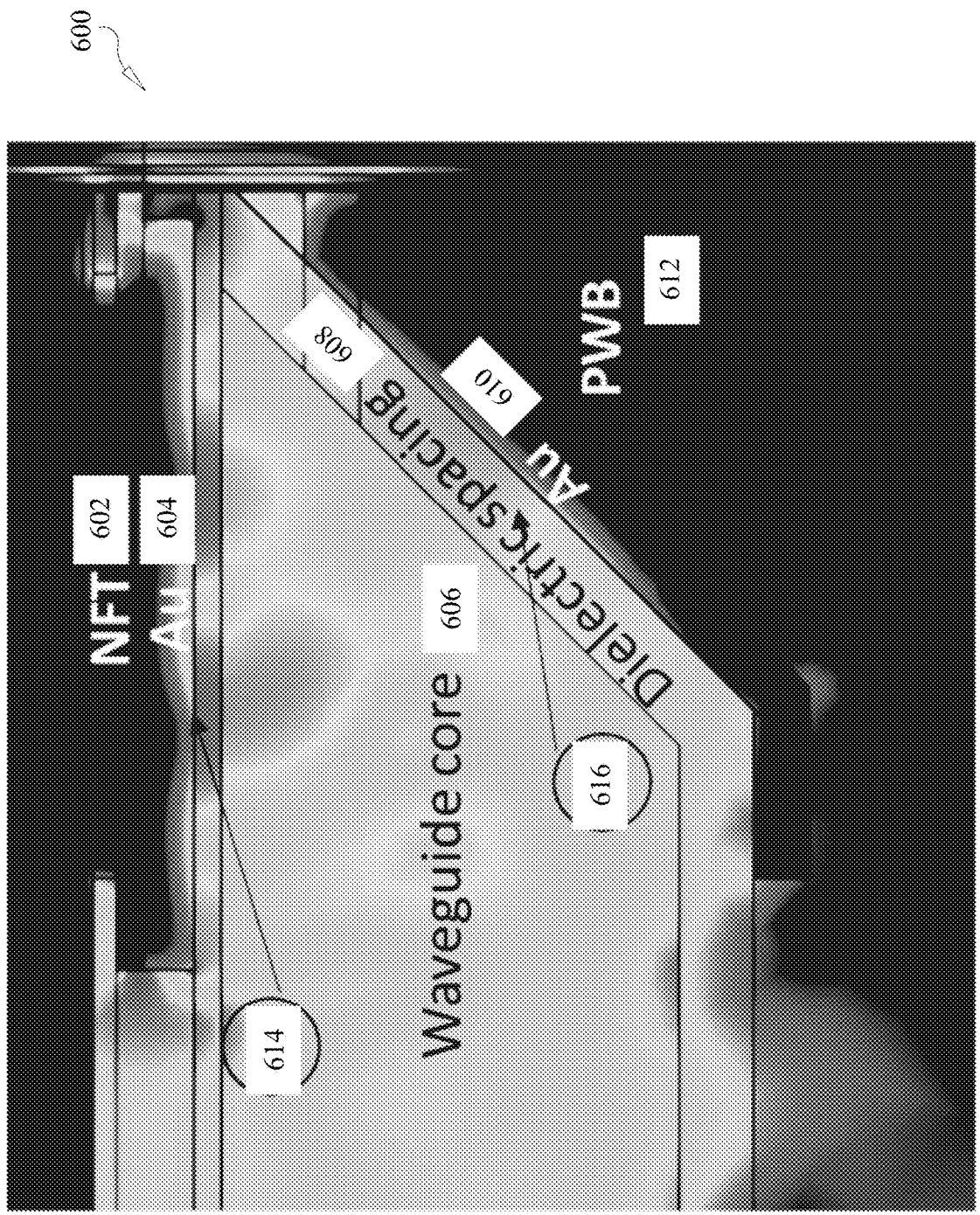
FIG. 6 illustrates an example illustration of a near electric field distribution of the NFT, according to some embodiments.

FIG. 6 illustrates an example illustration 600 of a near electric field distribution of the NFT. As shown in FIG. 6, an NFT 602 can be disposed over a Au layer 604. Further, a waveguide core 606 can be disposed adjacent to the Au layer 604 and a dielectric spacer 608. A second gold layer 610 can be disposed between the dielectric spacer 608 and a PWB 612.

FIG. 6 shows the near electric field distribution inside NFT around waveguide core in a simulation. The incident light from waveguide can excite two propagating surface plasmon polaritons. One strong field (614) propagates on the Au interface at bottom of the NFT and another weaker one (616) travels on the top slope surface on the Au coated waveguide blocker. This propagating SPP on the coated PWB surface can utilize the uncoupled waveguide energy and background NFT scattering which efficiently absorb and reduces the background in the recording media. With the reduction of thermal background, localized heating is mainly from NFT PEG with very small area. Under the highly confined optical energy, thermal gradient in the recording layer can be improved.

Table 1 below summarizes the thermal gradient of HAMR head in down track direction (DTTG) and cross track direction (CTTG) with triangular prism shaped waveguide blocker and parabolic shaped waveguide blocker described in above. Compare to the Au coated parabolic waveguide blocker from this invention.

TABLE 1

| Waveguide blocker design | DTTG (K/nm) | CTTG (K/nm) |
|---|---|---|
| Triangular prism | 7.17 | 7.45 |
| Parabolic | 7.68 | 8.12 |
| Au coated parabolic | 8.1 | 8.61 |

Figure 7:
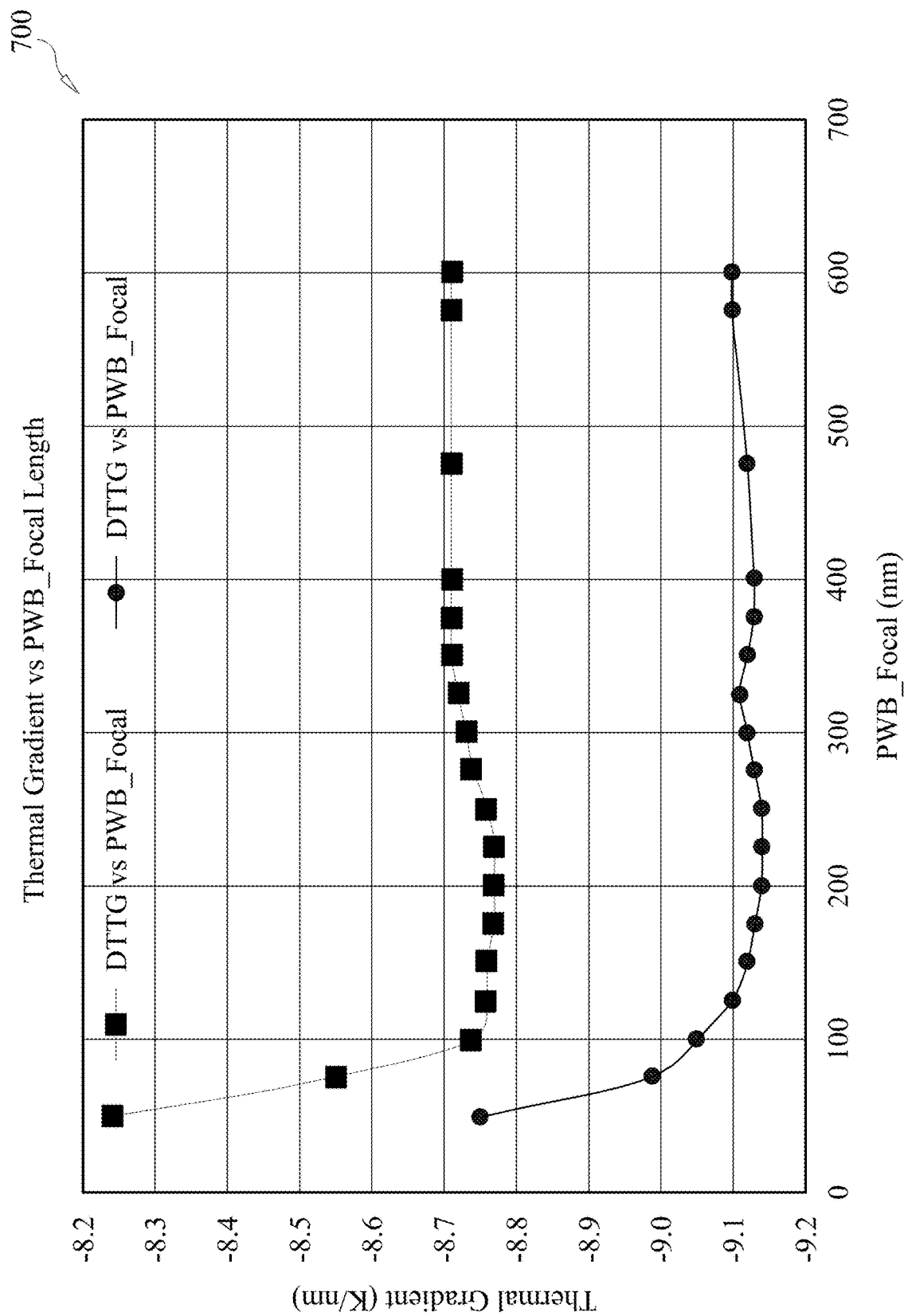
FIG. 7 is a graphical representation of an example focal length of a PWB structure vs. a thermal gradient, according to some embodiments.

FIG. 7 is a graphical representation 700 of an example focal length of a PWB structure vs. a thermal gradient. FIG. 7 shows the impact of PWB_focal with Au coating to the thermal gradient of the hot spot in the recording layer. Head thermal gradient can be optimized at 225 nm focal length where both down track and cross track gradient are maximized.

Figure 8:
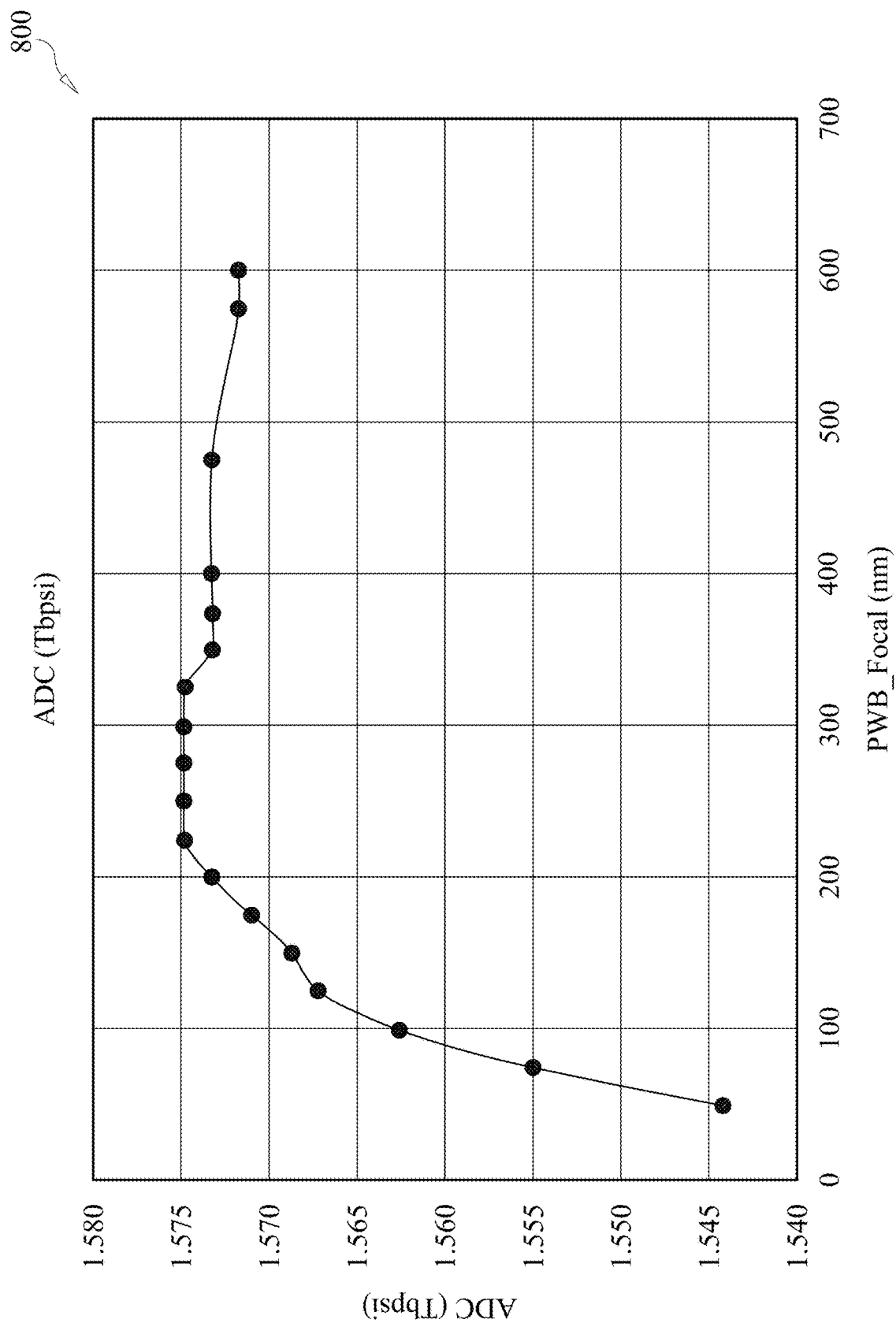
FIG. 8 is a graphical representation of an example focal length of PWB structure vs ADC (Tbpsi), according to some embodiments.

FIG. 8 is a graphical representation 800 of an example focal length of PWB structure vs ADC (Tbpsi). FIG. 8 shows the impact of PWB_focal to ADC. This can also show that area density capacity (ADC) of the HAMR head is increased when PWB_focal increases from 50 nm to 225 nm, then gradually decrease when focal length continues to increase to 600 nm and beyond. These results can indicate that the background electromagnetic radiation is controllable by the change of parabolic focal length on the waveguide blocker. The reduced background can help eliminate thermal background in the recording medium therefor thermal gradient is improved.

Figure 9:
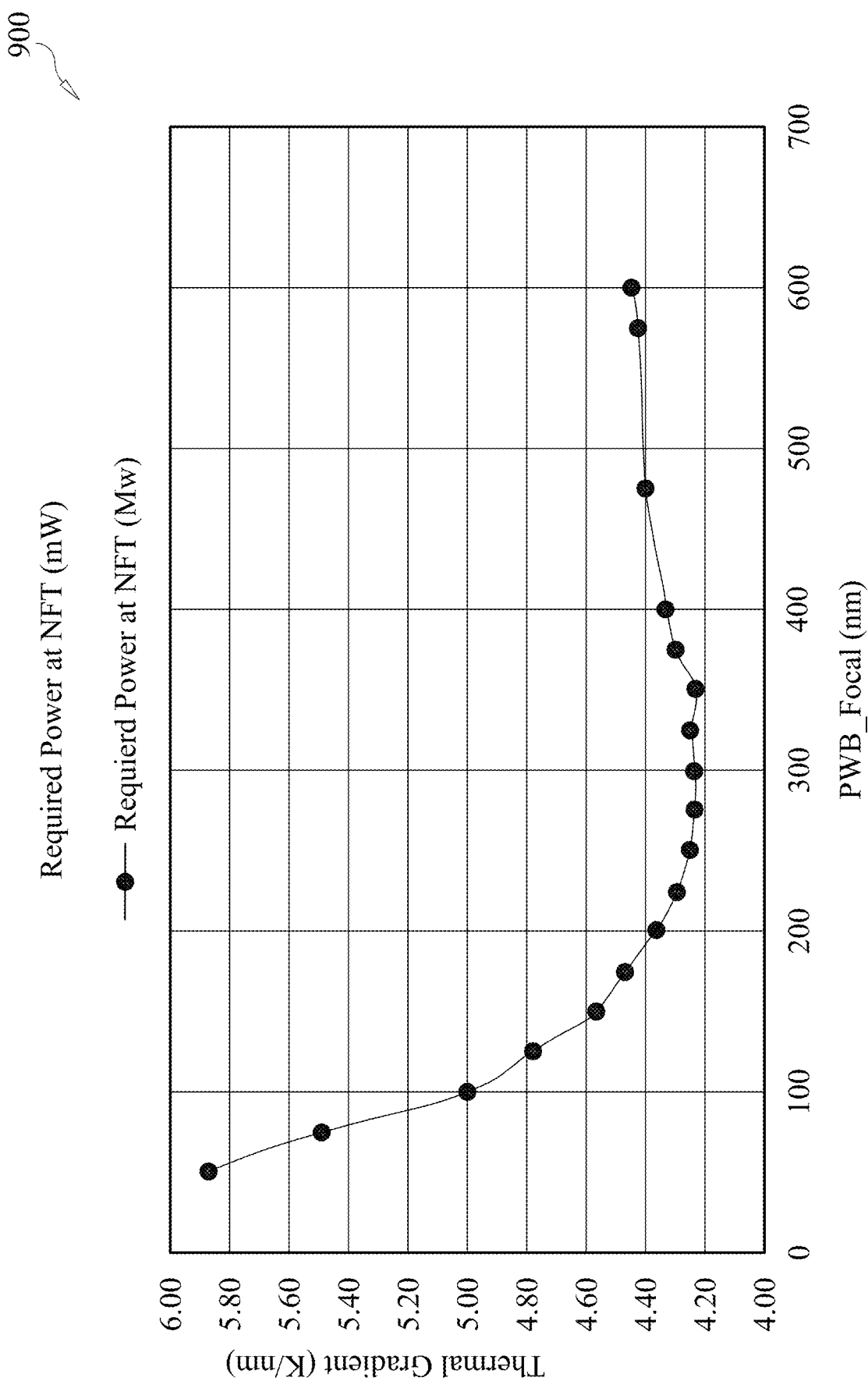
FIG. 9 is a graphical representation of an example parabolic waveguide blocker focal length impact to HAMR head performance, according to some embodiments.

FIG. 9 is a graphical representation 900 of an example parabolic waveguide blocker focal length impact to HAMR head performance. FIG. 9 shows the impact of changing PWB_focal to the NFT efficiency plotted as required laser power at NFT (mW) to enable HAMR writing in the recording layer. The smaller required laser power at NFT can mean a higher NFT system efficiency which is preferred in the HAMR head for reliability consideration.

Figure 10A:
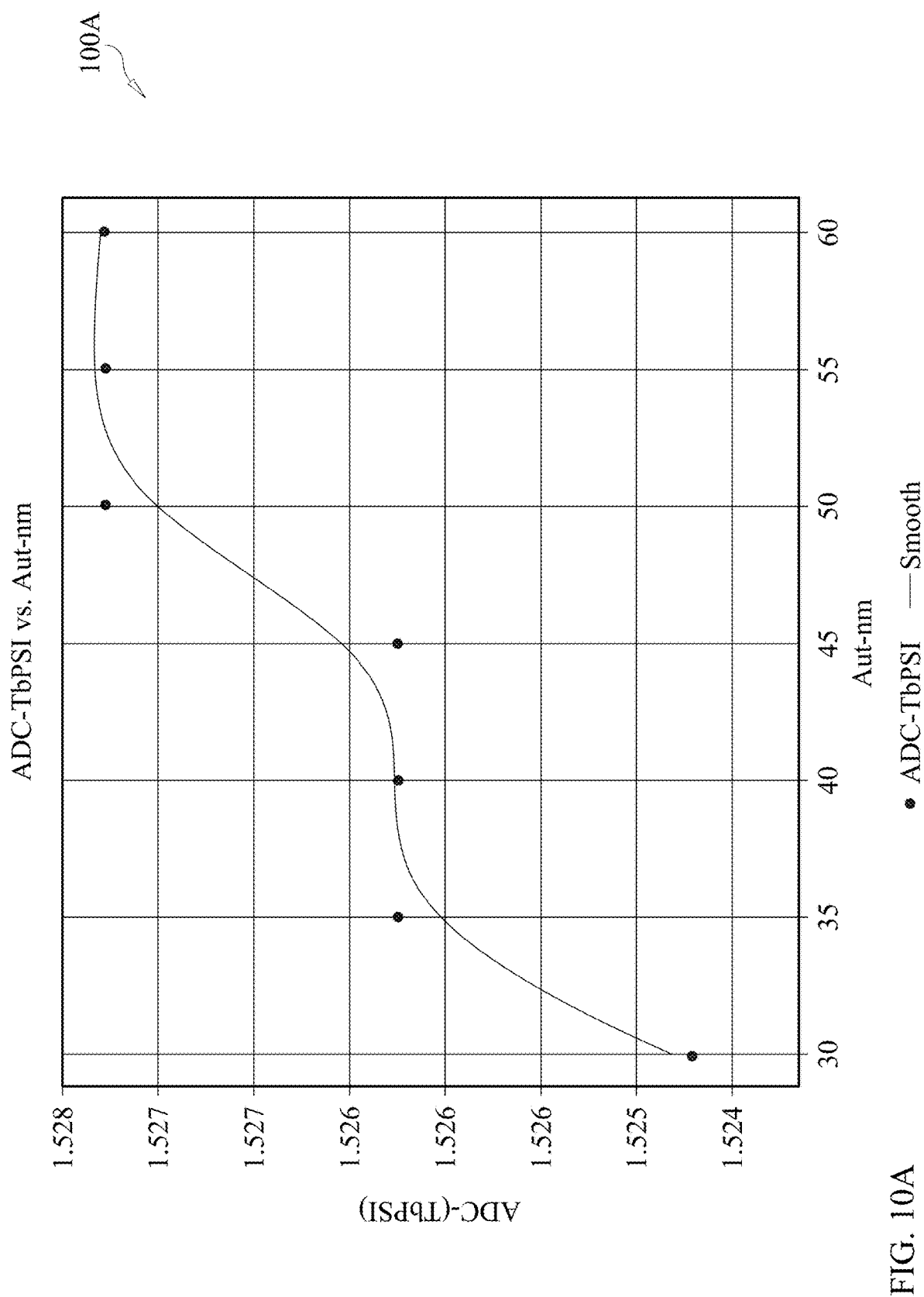
FIGS. 10A-B provide graphical representations of an example impact of Au film thickness on parabolic waveguide blocker, according to some embodiments.
Figure 10B:
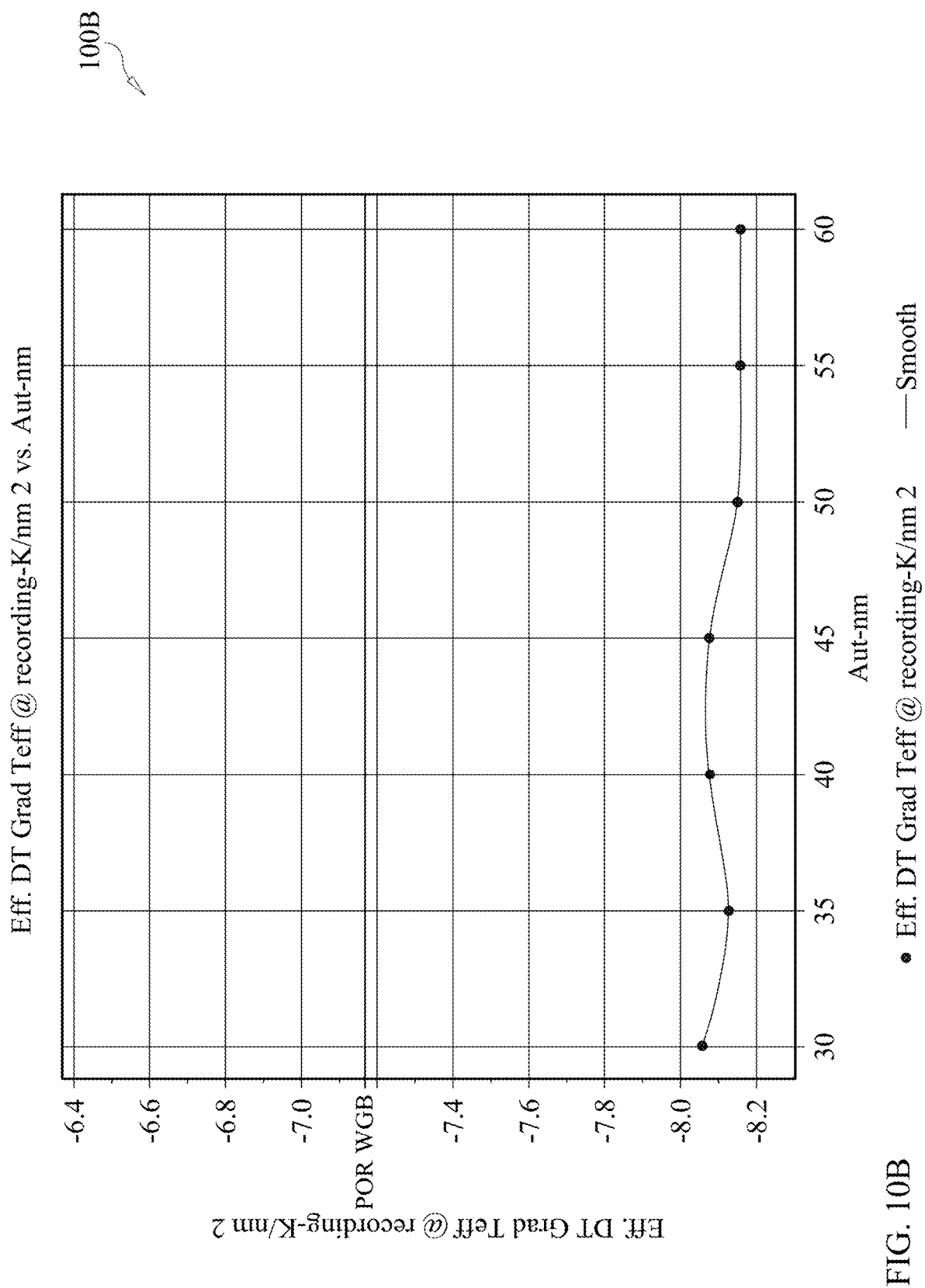

Thin film coating with noble metals such as Au, Rh, Pt and Ir can enable the plasmonic effect which can improve the light coupling from waveguide. FIGS. 10A-B provide graphical representations 1000A-B of an example impact of Au film thickness on parabolic waveguide blocker. FIG. 10A illustrates an example impact of ADC vs Au thickness, while FIG. 10B illustrates impact of down track thermal gradient (K/nm). FIGS. 10A-B illustrate Au coating thickness impact to ADC and thermal gradient. The noble metal coating can increase thermal gradient and reduce the required working laser power known as Ieff.

Figure 11B:
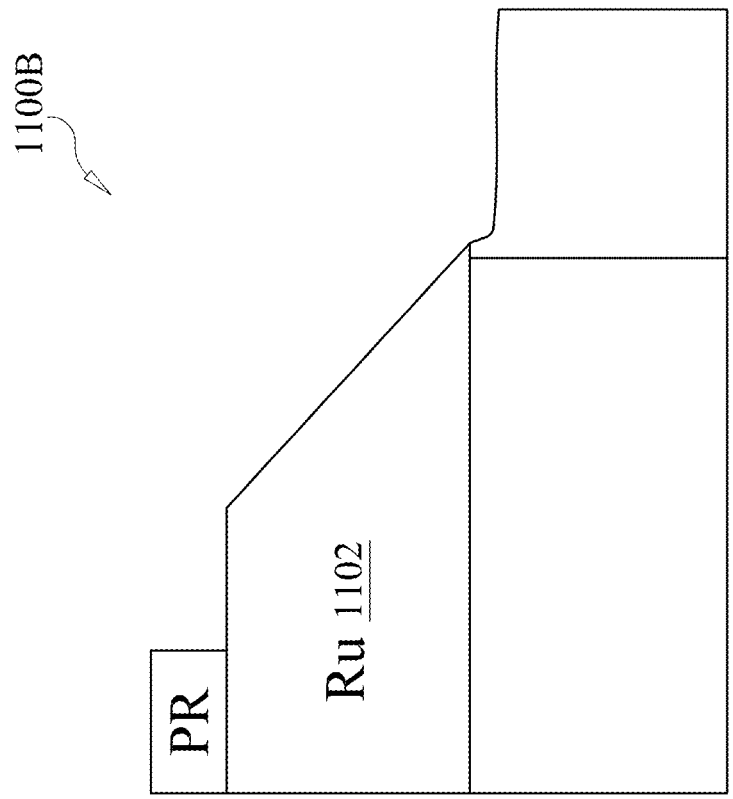
FIGS. 11A-11H illustrate views of a process flow for creating a parabolic shaped waveguide blocker with a noble metal coating, according to some embodiments.
Figure 11A:
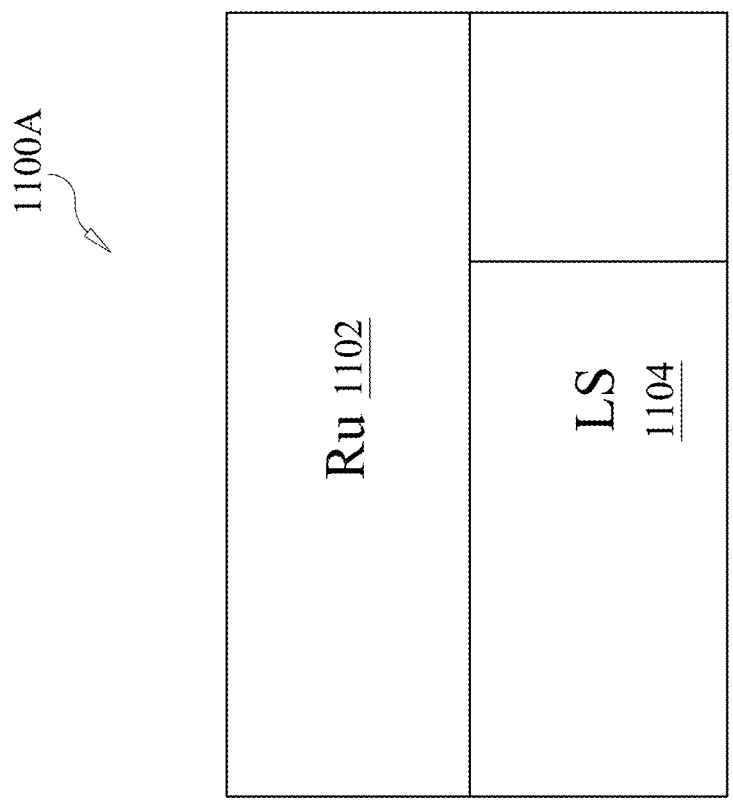

FIGS. 11A-11G illustrate views 1100A-G of a process flow for creating a parabolic shaped waveguide blocker with a noble metal coating. For instance, in FIG. 11A, a full Ruthenium (Ru) layer 1102 can be disposed over a leading shield (LS) 1104. In FIG. 11B, a photoresist (PR) 1106 mask can be disposed over the Ru layer 1102. The resist can be formed into a parabolic shape, and then Ion Beam Etching (IBE) can be performed to create a taper feature with an approximate taper angle of WGBa (ADC is optimized at WGBa=45 degree).

Figure 11D:
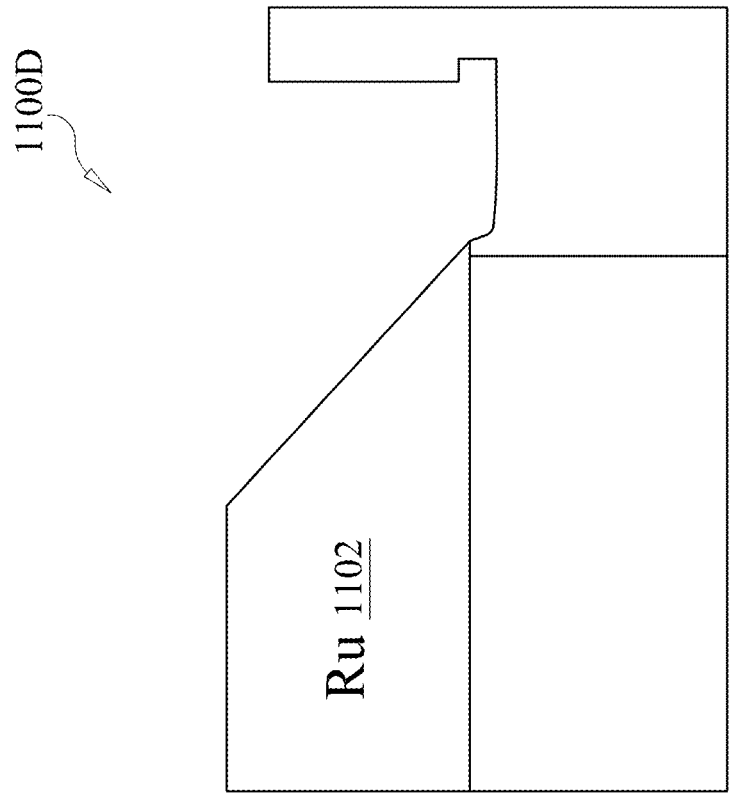
Figure 11C:
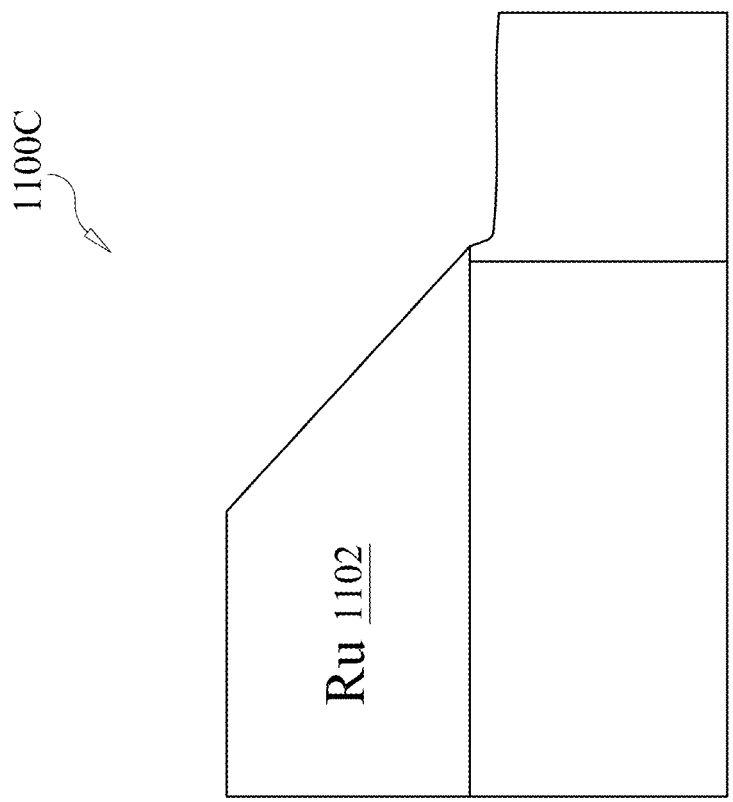

In FIG. 11C, the resist layer (1106) can be removed to form the parabolic-shaped waveguide blocker. In FIG. 11D, a second PR layer 1108 can be applied onto a surface of the waveguide blocker, shaping it into a parabolic shape. In FIG. 11E, a noble metal layer 1110 (such as Gold (Au), Rhodium (Rh), or Iridium (Ir)) can be deposited on top of the blocker. The noble metal thickness can fall within the range of 20-80 nanometers.

Figure 11F:
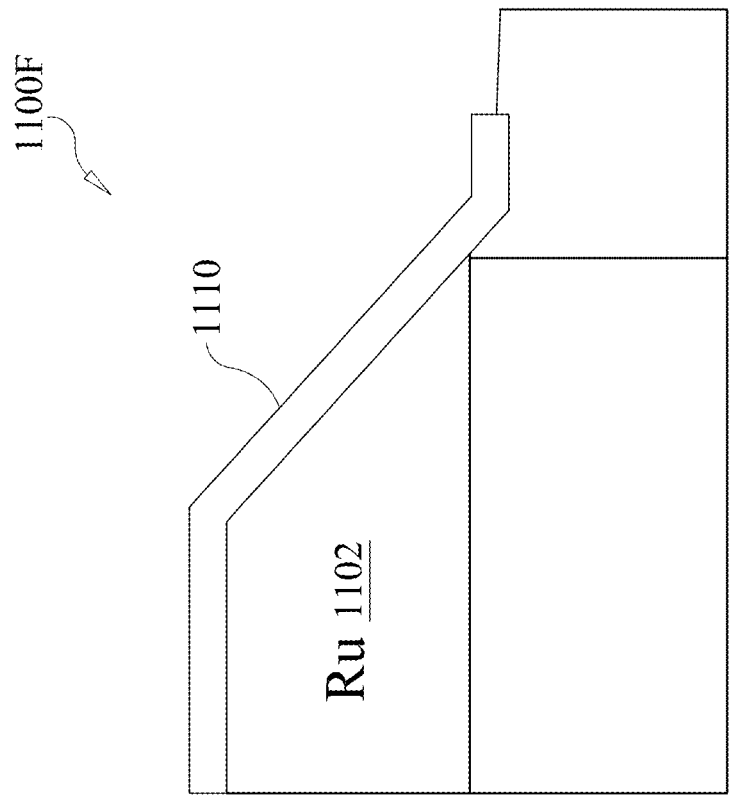
Figure 11E:
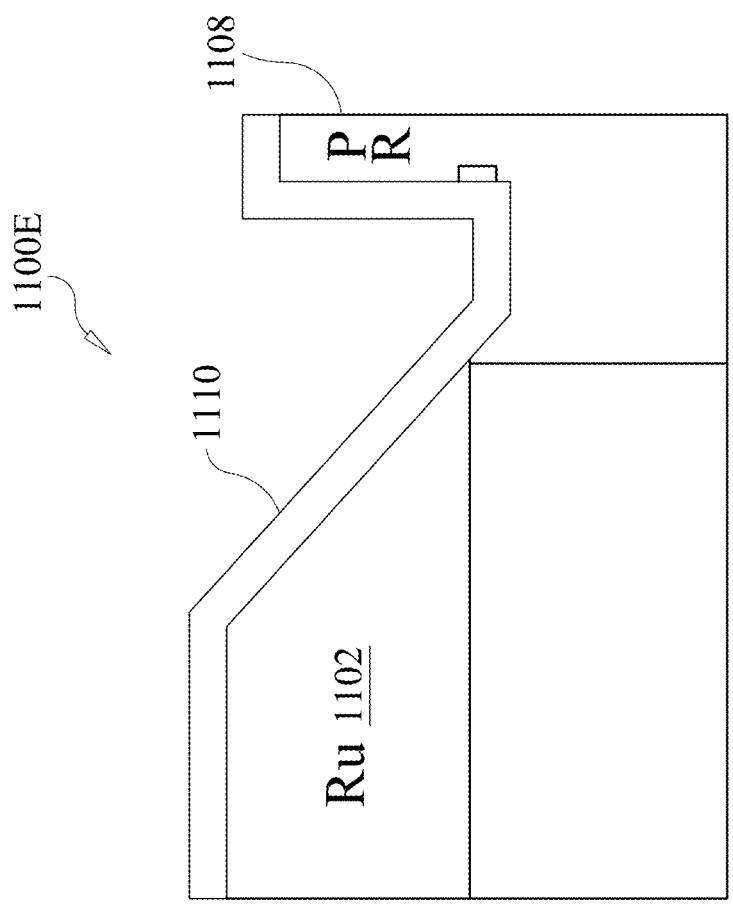
Figure 11H:
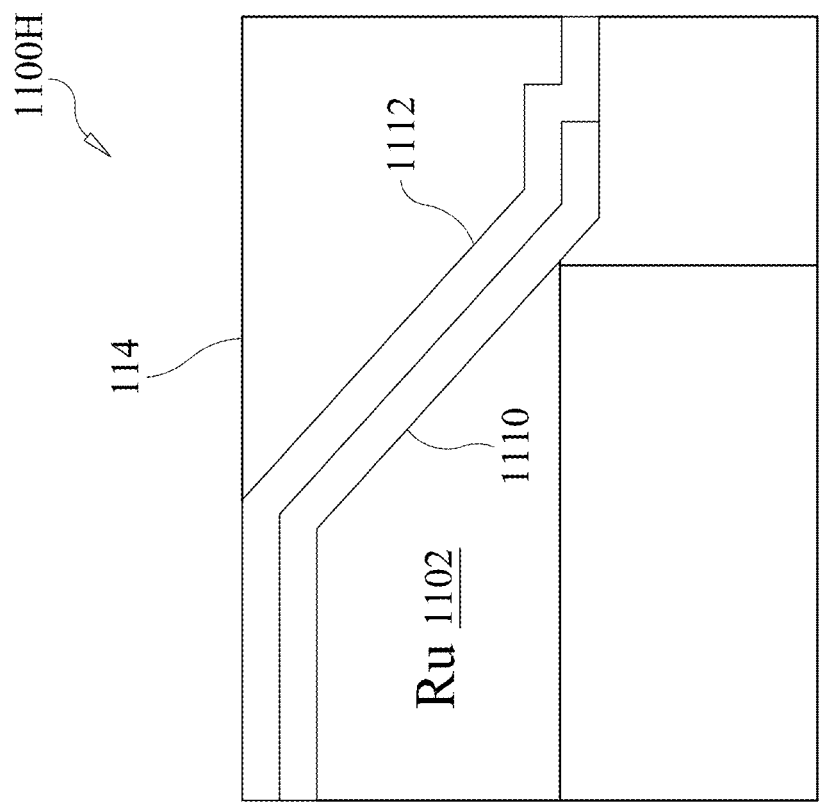
Figure 11G:
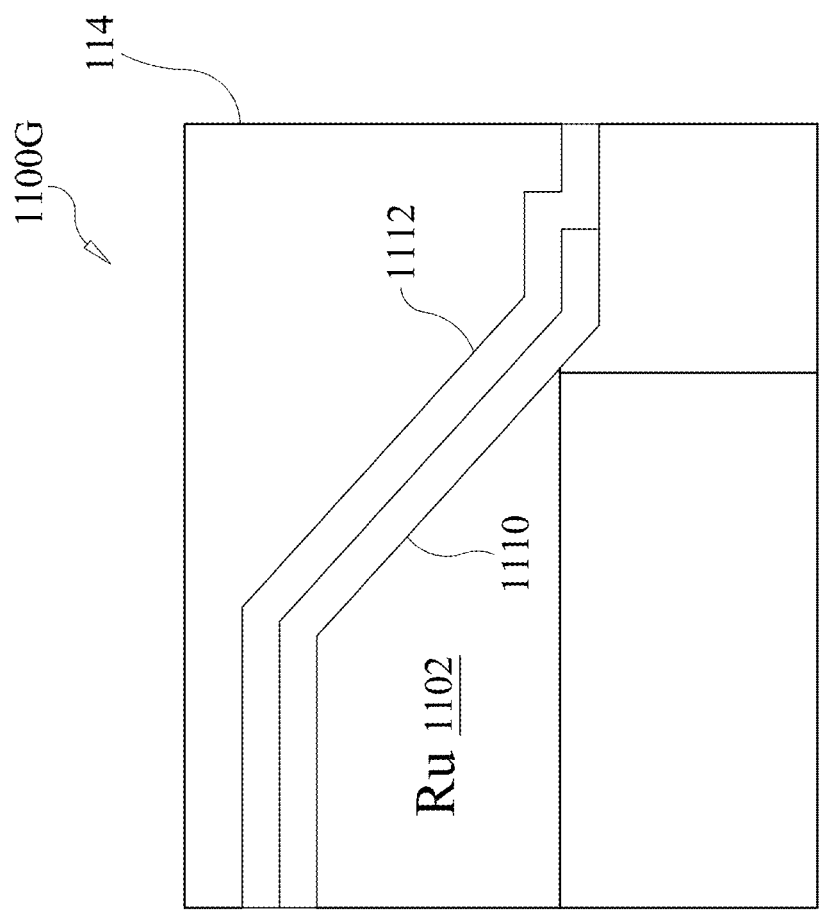

In FIG. 11F, the second resist layer 1108 can be removed to create the noble metal coating on top of the blocker. In FIG. 11G, a full film of silicon dioxide (SiO$_2$) 1112 followed by a deposition of Tantalum Oxide (TaOx) 1114 can serve as the waveguide (WvG) core. In FIG. 11H, the TaOx topography can be planarized using Chemical Mechanical Planarization (CMP) to ensure a smooth and even surface. A final fabrication can include a recording head writer structure with waveguide, waveguide blocker, NFT, and magnetic devices is shown in the above figures. The approach of FIGS. 11A-H focuses on patterning the noble metal coating by selectively removing the noble metal in the filed with liftoff process.

Figure 12B:
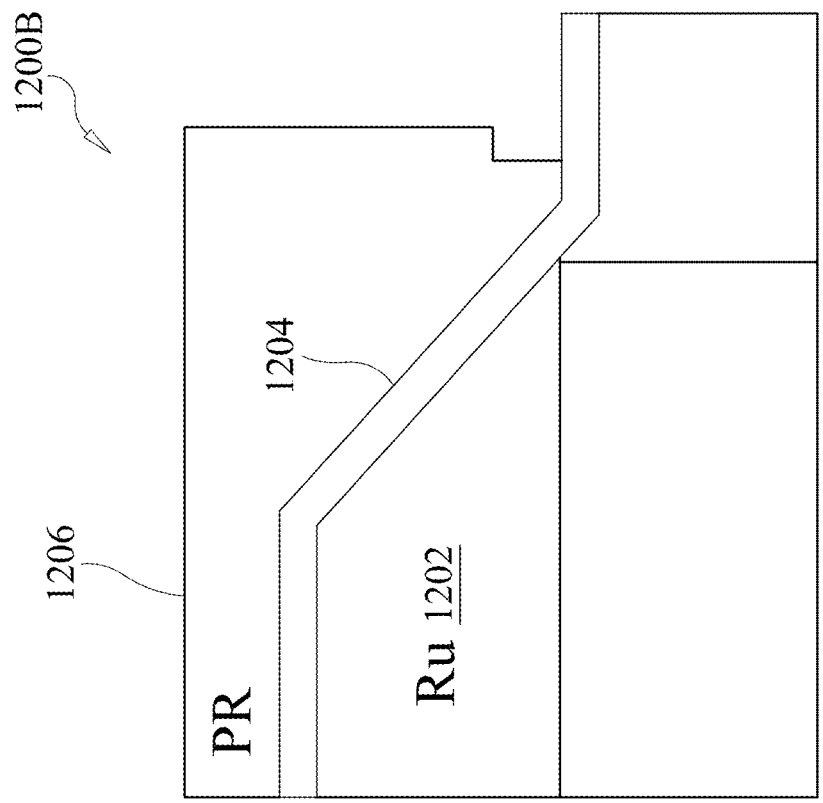
FIGS. 12A-C illustrate another example approach for noble metal coating fabrication, according to some embodiments.
Figure 12A:
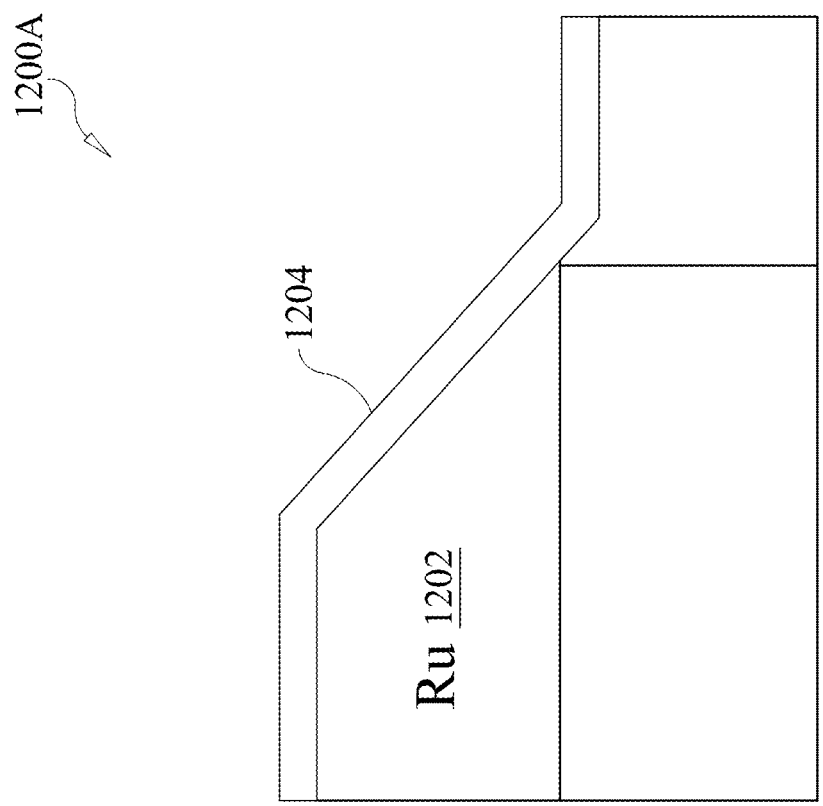
Figure 12C:
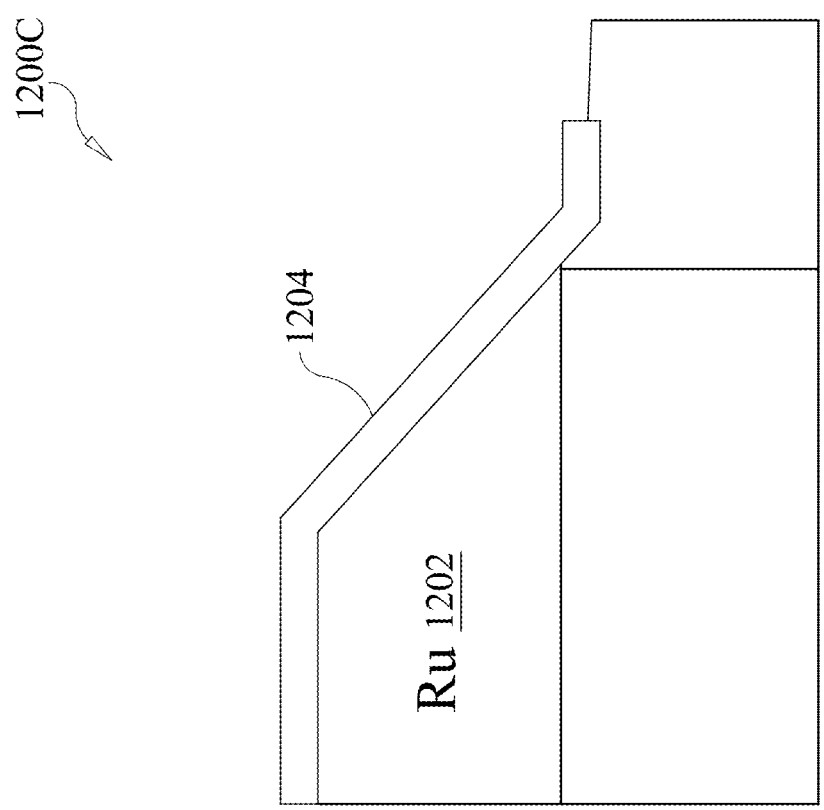

Another example approach for noble metal coating fabrication is shown in FIGS. 12A-C. As shown in FIG. 12A, a first view 1200A illustrates a full film of noble metal 1204, such as Gold (Au), Rhodium (Rh), or Iridium (Ir), on top of the waveguide blocker (e.g., Ru 1202). The thickness of the noble metal can fall within the range of 20-80 nanometers. In FIG. 12B, a second view 1200B can show a PR 1206 being disposed over the surface of the noble metal-coated layer 1204. The resist can be shaped into a parabolic shape. Then, an Ion Beam Etching (IBE) can be performed to selectively mill the noble metal from the field areas, leaving the rest intact. In FIG. 12C, a third view 1200C can show the PR being removed to reveal the noble metal coating on top of the blocker, with the parabolic shape retained. This approach can focus on depositing the noble metal first and then selectively removing it using Ion Beam Etching, resulting in the desired coating.

In a first example embodiment, a heat-assisted magnetic recording (HAMR) write head is provided. The HAMR write head can include a main pole, a waveguide core, and a bilayer transducer disposed between the main pole and the waveguide core. The HAMR write head can also include a dielectric spacer layer disposed adjacent to the waveguide core and a parabolic waveguide blocker (PWB). The HAMR write head can also include a noble metal layer disposed between the PWB and the dielectric spacer layer.

In some instances, the noble metal layer comprises a thickness of between 20-100 nanometers.

In some instances, the noble metal layer comprises any of Ruthenium (Ru), Iridium (Ir), Platinum (Pt), and Gold (Au).

In some instances, the noble metal layer comprises a parabolic shape to match a shape of the PWB, and wherein the PWB comprises a taper angle in the range of about 10-90 degrees with respect to ABS normal.

In some instances, the dielectric spacer layer comprises materials such as Silicon Oxide (SiOx), Aluminum Oxide (AlOx), Titanium Oxide (TiOx), Magnesium Oxide (MgOx) and wherein the waveguide core comprises a high index material such as Niobium Oxide (NbOx), Tantalum Oxide (TaOx).

In another example embodiment, a device is provided. The device can include a waveguide core, a dielectric spacer layer disposed adjacent to the waveguide core, and a waveguide blocker. The device can also include a noble metal layer disposed between the waveguide blocker and the dielectric spacer layer.

In some instances, the device can also include a main pole and a bilayer transducer disposed between the main pole and the waveguide core.

In some instances, the waveguide blocker is triangular prism shaped or parabolic shaped.

In some instances, the noble metal layer comprises a thickness of between 20-100 nanometers.

In some instances, the noble metal layer comprises any of Ruthenium (Ru), Iridium (Ir), Platinum (Pt), and Gold (Au).

In some instances, the noble metal layer comprises a parabolic shape to match a shape of the PWB, and wherein the PWB comprises a taper angle of around 10-90 degrees with respect to ABS normal degrees.

In another example embodiment, a method for manufacturing a parabolic-shaped waveguide blocker with a noble metal layer is provided. The method can include depositing a metallic layer on top of a leading shield. The method can also include applying a first photoresist (PR) mask over at least a part of the metallic layer. The method can also include etching a portion of the metallic layer to form a tapered edge of the metallic layer with a taper angle.

The method can also include applying a second PR mask over at least part of the leading shield. The method can also include depositing a noble metal layer over the metallic layer and the second PR mask. The method can also include depositing a first oxide layer over the noble metal layer. The method can also include depositing a second oxide layer over the first oxide layer to serve as a waveguide core.

In some instances, the metallic layer comprises Ruthenium (Ru).

In some instances, the method can also include shaping the first PR mask into a parabolic shape and shaping the second PR mask into the parabolic shape.

In some instances, the etching the portion of the metallic layer is performed via an Ion Beam Etching (IBE) process, and wherein the taper angle is around 10-90 degrees with respect to ABS normal degrees.

In some instances, the method can also include removing the first PR mask.

In some instances, the method can also include removing the second PR mask.

In some instances, the noble metal layer comprises any of Ruthenium (Ru), Iridium (IR) and Gold (Au), and wherein a thickness of the noble metal layer is between 20-80 nanometers.

In some instances, the method can also include planarizing the second oxide layer using a chemical mechanical planarization (CMP) process.

In some instances, the first oxide layer comprises materials such as Silicon Oxide (SiOx), Aluminum Oxide (AlOx), Titanium Oxide (TiOx), Magnesium Oxide (MgOx) and wherein the waveguide core comprises a high index material such as Niobium Oxide (NbOx), Tantalum Oxide (TaOx).

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A heat-assisted magnetic recording (HAMR) write head comprising:
   a main pole;
   a waveguide core;
   a bilayer transducer disposed between the main pole and the waveguide core;
   a dielectric spacer layer disposed adjacent to the waveguide core, wherein the dielectric spacer layer comprises a dielectric material that includes any of: Silicon Oxide (SiOx), Aluminum Oxide (AlOx), Titanium Oxide (TiOx), or Magnesium Oxide (MgOx);
   a parabolic waveguide blocker (PWB); and
   a noble metal layer disposed between the PWB and the dielectric spacer layer.

2. The HAMR write head of claim 1, wherein the noble metal layer comprises a thickness of between 20-100 nanometers.

3. The HAMR write head of claim 1, wherein the noble metal layer comprises any of Ruthenium (Ru), Iridium (Ir), Platinum (Pt), and Gold (Au) and their alloy.

4. The HAMR write head of claim 1, wherein the noble metal layer comprises a parabolic shape to match a shape of the PWB, and wherein the PWB comprises a taper angle in the range of about 10-90 degrees with respect to ABS normal degrees.

5. The HAMR write head of claim 1, wherein the dielectric spacer layer comprises a dielectric material, and the waveguide core comprises a high index material.

6. A device comprising:
   a waveguide core;
   a dielectric spacer layer disposed adjacent to the waveguide core, wherein the dielectric spacer layer comprises a dielectric material that includes any of: Silicon Oxide (SiOx), Aluminum Oxide (AlOx), Titanium Oxide (TiOx), or Magnesium Oxide (MgOx);
   a waveguide blocker; and
   a noble metal layer disposed between the waveguide blocker and the dielectric spacer layer.

7. The device of claim 6, further comprising:
   a main pole; and
   a bilayer transducer disposed between the main pole and the waveguide core.

8. The device of claim 6, wherein the waveguide blocker is triangular prism shaped or parabolic shaped.

9. The device of claim 6, wherein the noble metal layer comprises a thickness of between 20-100 nanometers.

10. The device of claim 6, wherein the noble metal layer comprises any of Ruthenium (Ru), Iridium (Ir), Platinum (Pt), and Gold (Au) and their alloy.

11. The HAMR write head of claim 1, wherein the noble metal layer comprises a parabolic shape to match a shape of the PWB, and wherein the PWB comprises a taper angle of around 10-90 degrees with respect to ABS normal degrees.

12. A method for manufacturing a parabolic-shaped waveguide blocker with a noble metal layer, the method comprising:
   depositing a metallic layer on top of a leading shield;
   applying a first photoresist (PR) mask over at least a part of the metallic layer;
   etching a portion of the metallic layer to form a tapered edge of the metallic layer with a taper angle;
   applying a second PR mask over at least part of the leading shield;
   depositing a noble metal layer over the metallic layer and the second PR mask;
   depositing a first oxide layer over the noble metal layer; and
   depositing a second oxide layer over the first oxide layer to serve as a waveguide core.

13. The method of claim 12, wherein the metallic layer comprises Ruthenium (Ru).

14. The method of claim 12, further comprising:
   shaping the first PR mask into a parabolic shape; and
   shaping the second PR mask into the parabolic shape.

15. The method of claim 12, wherein the etching the portion of the metallic layer is performed via an Ion Beam Etching (IBE) process, and wherein the taper angle is in the range of about 10-90 degrees with respect to ABS normal degrees.

16. The method of claim 12, further comprising:
   removing the first PR mask.

17. The method of claim 12, further comprising:
   removing the second PR mask.

18. The method of claim 12, wherein the noble metal layer comprises any of Ruthenium (Ru), Iridium (IR) and Gold (Au), and their alloy, and wherein a thickness of the noble metal layer is between 20-80 nanometers.

19. The method of claim 12, further comprising:
   planarizing the second oxide layer using a chemical mechanical planarization (CMP) process.

20. The method of claim 12, wherein the first oxide layer comprises a dielectric material and wherein the waveguide core comprises a high index material.

21. The method of claim 20, wherein the first oxide layer comprises any of: Silicon Oxide (SiOx), Aluminum Oxide (AlOx), Titanium Oxide (TiOx), or Magnesium Oxide (MgOx) and wherein the high index material comprises any of: Niobium Oxide (NbOx), or Tantalum Oxide (TaOx).

* * * * *